United States Patent
Sklar

(10) Patent No.: US 10,844,504 B2
(45) Date of Patent: Nov. 24, 2020

(54) NICKEL-CHROMIUM NANOLAMINATE COATING HAVING HIGH HARDNESS

(71) Applicant: Modumetal, Inc., Seattle, WA (US)

(72) Inventor: Glenn Sklar, Seattle, WA (US)

(73) Assignee: MODUMETAL, INC., Seattle, WA (US)

( * ) Notice: Subject to any disclaimer, the term of this patent is extended or adjusted under 35 U.S.C. 154(b) by 0 days.

(21) Appl. No.: 16/191,386

(22) Filed: Nov. 14, 2018

(65) Prior Publication Data

US 2019/0309430 A1  Oct. 10, 2019

Related U.S. Application Data

(63) Continuation of application No. 14/855,252, filed on Sep. 15, 2015, now abandoned, which is a continuation of application No. PCT/US2014/030381, filed on Mar. 17, 2014.

(60) Provisional application No. 61/802,112, filed on Mar. 15, 2013.

(51) Int. Cl.
```
B32B 15/01    (2006.01)
C25D 3/56     (2006.01)
C25D 1/00     (2006.01)
C25D 5/14     (2006.01)
C25D 5/18     (2006.01)
C25D 3/12     (2006.01)
C25D 3/20     (2006.01)
C25D 3/38     (2006.01)
C25D 3/54     (2006.01)
C25D 9/04     (2006.01)
C25D 3/06     (2006.01)
C25D 5/34     (2006.01)
C25D 5/36     (2006.01)
```

(52) U.S. Cl.
CPC .............. *C25D 3/562* (2013.01); *B32B 15/01* (2013.01); *C25D 1/00* (2013.01); *C25D 3/12* (2013.01); *C25D 3/20* (2013.01); *C25D 3/38* (2013.01); *C25D 3/54* (2013.01); *C25D 5/14* (2013.01); *C25D 5/18* (2013.01); *C25D 9/04* (2013.01); *C25D 3/06* (2013.01); *C25D 5/34* (2013.01); *C25D 5/36* (2013.01)

(58) Field of Classification Search
None
See application file for complete search history.

(56) References Cited

U.S. PATENT DOCUMENTS

| | | |
|---|---|---|
| 2,428,033 A | 9/1947 | Nachtman |
| 2,436,316 A | 2/1948 | Lum et al. |
| 2,470,775 A | 5/1949 | Jernstedt et al. |
| 2,558,090 A | 6/1951 | Jernstedt |
| 2,642,654 A | 6/1953 | Ahrens |
| 2,678,909 A | 5/1954 | Jernstedt et al. |
| 2,694,743 A | 11/1954 | Ruskin et al. |
| 2,706,170 A | 4/1955 | Marchese |
| 2,891,309 A | 6/1959 | Fenster |
| 3,090,733 A | 5/1963 | Brown |
| 3,255,781 A | 6/1966 | Gillespie, Jr. |
| 3,282,810 A | 11/1966 | Odekerken |
| 3,359,469 A | 12/1967 | Levy et al. |
| 3,362,851 A | 1/1968 | Dunster |
| 3,483,113 A | 12/1969 | Carter |
| 3,549,505 A | 12/1970 | Hanusa |
| 3,616,286 A | 10/1971 | Aylward et al. |
| 3,633,520 A | 1/1972 | Stiglich, Jr. |
| 3,716,464 A | 2/1973 | Kovac et al. |
| 3,753,664 A | 8/1973 | Klingenmaier et al. |
| 3,759,799 A | 9/1973 | Reinke |
| 3,787,244 A | 1/1974 | Schulmeister et al. |
| 3,866,289 A | 2/1975 | Brown et al. |
| 3,994,694 A | 11/1976 | Clauss et al. |
| 3,996,114 A | 12/1976 | Ehrsam |
| 4,053,371 A | 10/1977 | Towsley |
| 4,105,526 A | 8/1978 | Lewellen, Jr. et al. |
| 4,107,003 A | 8/1978 | Anselrode |
| 4,191,617 A | 3/1980 | Hurley et al. |
| 4,204,918 A | 5/1980 | McIntyre et al. |
| 4,216,272 A | 8/1980 | Clauss |

(Continued)

FOREIGN PATENT DOCUMENTS

| | | |
|---|---|---|
| CN | 102148339 A | 8/1911 |
| CN | 1257941 A | 6/2000 |

(Continued)

OTHER PUBLICATIONS

"Improvement of Galvanneal Coating Adherence on Advanced High Strength Steel," Appendix 1: Literature review (Task 1), Progress Report No. 1 to Galvanized Autobody Partnership Program of International Zinc Association, Brussels, Belgium, Jun. 2008-Jul. 2009, Issued: Sep. 2009.

(Continued)

*Primary Examiner* — Daniel J. Schleis

(74) *Attorney, Agent, or Firm* — Seed Intellectual Property Law Group LLP

(57) ABSTRACT

The present disclosure describes electrodeposited nanolaminate materials having layers comprised of nickel and/or chromium with high hardness. The uniform appearance, chemical resistance, and high hardness of the nanolaminate NiCr materials described herein render them useful for a variety of purposes including wear (abrasion) resistant barrier coatings for use both in decorative as well as demanding physical, structural and chemical environments.

19 Claims, No Drawings

(56) References Cited

U.S. PATENT DOCUMENTS

| | | |
|---|---|---|
| 4,246,057 A | 1/1981 | Janowski et al. |
| 4,284,688 A | 8/1981 | Stücheli et al. |
| 4,314,893 A | 2/1982 | Clauss |
| 4,405,427 A | 9/1983 | Byrd |
| 4,422,907 A | 12/1983 | Birkmaier et al. |
| 4,461,680 A * | 7/1984 | Lashmore ............... C25D 3/562 204/DIG. 9 |
| 4,464,232 A | 8/1984 | Wakano et al. |
| 4,510,209 A | 4/1985 | Hada et al. |
| 4,519,878 A | 5/1985 | Hara et al. |
| 4,540,472 A | 9/1985 | Johnson et al. |
| 4,543,300 A | 9/1985 | Hara et al. |
| 4,543,803 A | 10/1985 | Keyasko |
| 4,591,418 A | 5/1986 | Snyder |
| 4,592,808 A | 6/1986 | Doubt |
| 4,597,836 A | 7/1986 | Schaer et al. |
| 4,620,661 A | 11/1986 | Slatterly |
| 4,652,348 A | 3/1987 | Yahalom et al. |
| 4,666,567 A | 5/1987 | Loch |
| 4,670,356 A | 6/1987 | Sato et al. |
| 4,678,552 A | 7/1987 | Chen |
| 4,678,721 A | 7/1987 | den Broeder et al. |
| 4,702,802 A | 10/1987 | Umino et al. |
| H543 H | 11/1988 | Chen et al. |
| 4,795,735 A | 1/1989 | Liu et al. |
| 4,834,845 A | 5/1989 | Muko et al. |
| 4,839,214 A | 6/1989 | Oda et al. |
| 4,869,971 A | 9/1989 | Nee et al. |
| 4,885,215 A | 12/1989 | Yoshioka et al. |
| 4,904,542 A | 2/1990 | Mroczkowski |
| 4,904,543 A | 2/1990 | Sakakima et al. |
| 4,923,574 A | 5/1990 | Cohen |
| 4,975,337 A | 12/1990 | Hyner et al. |
| 5,043,230 A | 8/1991 | Jagannathan et al. |
| 5,045,356 A | 9/1991 | Uemura et al. |
| 5,056,936 A | 10/1991 | Mahrus et al. |
| 5,059,493 A | 10/1991 | Takahata |
| 5,073,237 A | 12/1991 | Bacher et al. |
| 5,079,039 A | 1/1992 | Heraud et al. |
| 5,156,729 A | 10/1992 | Mahrus et al. |
| 5,156,899 A | 10/1992 | Kistrup et al. |
| 5,158,653 A | 10/1992 | Lashmore et al. |
| 5,190,637 A | 3/1993 | Guckel |
| 5,228,967 A | 7/1993 | Crites et al. |
| 5,268,235 A | 12/1993 | Lashmore et al. |
| 5,300,165 A | 4/1994 | Sugikawa |
| 5,320,719 A | 6/1994 | Lasbmore et al. |
| 5,326,454 A | 7/1994 | Engelhaupt |
| 5,352,266 A | 10/1994 | Erb et al. |
| 5,378,583 A | 1/1995 | Guckel et al. |
| 5,413,874 A | 5/1995 | Moysan, III et al. |
| 5,431,800 A | 7/1995 | Kirchhoff et al. |
| 5,461,769 A | 10/1995 | McGregor |
| 5,472,795 A | 12/1995 | Atita |
| 5,489,488 A | 2/1996 | Asai et al. |
| 5,500,600 A | 3/1996 | Moyes |
| 5,547,096 A | 4/1996 | Kleyn |
| 5,527,445 A | 6/1996 | Palumbo |
| 5,545,435 A | 8/1996 | Steffier |
| 5,620,800 A | 4/1997 | De Leeuw et al. |
| 5,660,704 A | 8/1997 | Murase |
| 5,679,232 A | 10/1997 | Fedor et al. |
| 5,738,951 A | 4/1998 | Goujard et al. |
| 5,742,471 A | 4/1998 | Barbee, Jr. et al. |
| 5,783,259 A | 7/1998 | McDonald |
| 5,798,033 A | 8/1998 | Uemiya et al. |
| 5,800,930 A | 9/1998 | Chen et al. |
| 5,828,526 A | 10/1998 | Kagawa et al. |
| 5,912,069 A | 6/1999 | Yializis et al. |
| 5,930,085 A | 7/1999 | Kitade et al. |
| 5,942,096 A | 8/1999 | Ruzicka et al. |
| 5,952,111 A | 9/1999 | Sugg et al. |
| 6,036,832 A | 3/2000 | Knol et al. |
| 6,036,833 A | 3/2000 | Tang et al. |
| 6,071,398 A | 6/2000 | Martin et al. |
| 6,143,424 A | 11/2000 | Jonte et al. |
| 6,143,430 A | 11/2000 | Miyasaka et al. |
| 6,193,858 B1 | 2/2001 | Hradil et al. |
| 6,203,936 B1 | 3/2001 | Cisar et al. |
| 6,212,078 B1 | 4/2001 | Hunt et al. |
| 6,214,473 B1 | 4/2001 | Hunt et al. |
| 6,284,357 B1 | 9/2001 | Lackey et al. |
| 6,312,579 B1 | 11/2001 | Bank et al. |
| 6,344,123 B1 | 2/2002 | Bhatnagar |
| 6,355,153 B1 | 3/2002 | Uzoh et al. |
| 6,409,907 B1 | 6/2002 | Braun et al. |
| 6,415,942 B1 | 7/2002 | Fenton et al. |
| 6,461,678 B1 | 10/2002 | Chen et al. |
| 6,466,417 B1 | 10/2002 | Gill |
| 6,468,672 B1 * | 10/2002 | Donovan, III ........... C25D 5/14 205/169 |
| 6,537,683 B1 | 3/2003 | Staschko et al. |
| 6,547,944 B2 | 4/2003 | Schreiber et al. |
| 6,592,739 B1 | 7/2003 | Sonoda et al. |
| 6,739,028 B2 | 5/2004 | Sievenpiper et al. |
| 6,777,831 B2 | 8/2004 | Gutiérrez, Jr. et al. |
| 6,800,121 B2 | 10/2004 | Shahin |
| 6,884,499 B2 | 4/2005 | Penich et al. |
| 6,902,827 B2 | 6/2005 | Kelly et al. |
| 6,908,667 B2 | 6/2005 | Christ et al. |
| 6,979,490 B2 | 12/2005 | Steffier |
| 7,581,933 B2 | 9/2009 | Bruce et al. |
| 7,632,590 B2 | 12/2009 | Punsalan et al. |
| 7,736,753 B2 | 6/2010 | Deligianni et al. |
| 8,084,564 B2 | 12/2011 | Kano et al. |
| 8,152,985 B2 | 4/2012 | Macary |
| 8,192,608 B2 | 6/2012 | Matthews |
| 8,253,035 B2 | 8/2012 | Matsumoto |
| 8,585,875 B2 | 11/2013 | Cummings et al. |
| 8,814,437 B2 | 8/2014 | Braun |
| 9,005,420 B2 | 4/2015 | Tomantschger et al. |
| 9,080,692 B2 | 7/2015 | Tomomori et al. |
| 9,108,506 B2 | 8/2015 | Whitaker et al. |
| 9,115,439 B2 | 8/2015 | Whitaker |
| 9,234,294 B2 | 1/2016 | Whitaker et al. |
| 9,273,932 B2 | 3/2016 | Whitaker et al. |
| 9,732,433 B2 | 8/2017 | Caldwell et al. |
| 9,758,891 B2 | 9/2017 | Bao |
| 9,938,629 B2 | 4/2018 | Whitaker et al. |
| 10,041,185 B2 | 8/2018 | Sukenari |
| 10,253,419 B2 | 4/2019 | Lomasney |
| 10,266,957 B2 | 4/2019 | Sugawara et al. |
| 10,472,727 B2 | 11/2019 | Lomasney |
| 10,513,791 B2 | 12/2019 | Lomasney et al. |
| 10,544,510 B2 | 1/2020 | Lomasney |
| 10,662,542 B2 | 5/2020 | Caldwell et al. |
| 10,689,773 B2 | 6/2020 | Whitaker et al. |
| 2001/0037944 A1 | 11/2001 | Sanada et al. |
| 2002/0070118 A1 | 6/2002 | Schreiber et al. |
| 2002/0100858 A1 | 8/2002 | Weber |
| 2002/0179449 A1 | 12/2002 | Domeier et al. |
| 2003/0134142 A1 | 7/2003 | Ivey et al. |
| 2003/0234181 A1 | 12/2003 | Palumbo |
| 2003/0236163 A1 | 12/2003 | Chaturvedi et al. |
| 2004/0027715 A1 | 2/2004 | Hixson-Goldsmith et al. |
| 2004/0031691 A1 | 2/2004 | Kelly et al. |
| 2004/0067314 A1 | 4/2004 | Joshi et al. |
| 2004/0154925 A1 | 8/2004 | Podlaha et al. |
| 2004/0178076 A1 | 9/2004 | Stonas et al. |
| 2004/0211672 A1 | 10/2004 | Ishigami et al. |
| 2004/0234683 A1 | 11/2004 | Tanaka et al. |
| 2004/0239836 A1 | 12/2004 | Chase |
| 2005/0002228 A1 | 1/2005 | Dieny et al. |
| 2005/0109433 A1 | 5/2005 | Danger et al. |
| 2005/0181192 A1 | 8/2005 | Steffier |
| 2005/0205425 A1 | 9/2005 | Palumbo et al. |
| 2005/0221100 A1 | 10/2005 | Kirihara et al. |
| 2005/0279640 A1 | 12/2005 | Shimoyama et al. |
| 2006/0135281 A1 | 6/2006 | Palumbo et al. |
| 2006/0135282 A1 | 6/2006 | Palumbo et al. |
| 2006/0201817 A1 | 9/2006 | Guggemos et al. |
| 2006/0243597 A1 | 11/2006 | Matefi-Tempfli et al. |
| 2006/0269770 A1 | 11/2006 | Cox et al. |
| 2006/0272949 A1 | 12/2006 | Detor |

(56) References Cited

U.S. PATENT DOCUMENTS

| | | |
|---|---|---|
| 2006/0286348 A1 | 12/2006 | Sauer |
| 2007/0158204 A1 | 7/2007 | Taylor et al. |
| 2007/0269648 A1 | 11/2007 | Schuh et al. |
| 2007/0278105 A1 | 12/2007 | Ettel |
| 2008/0093221 A1 | 4/2008 | Basol |
| 2008/0102360 A1 | 5/2008 | Stimits et al. |
| 2008/0226976 A1 | 9/2008 | Stimits |
| 2008/0245669 A1 | 10/2008 | Yoshioka et al. |
| 2008/0271995 A1 | 11/2008 | Savastiouk et al. |
| 2009/0004465 A1 | 1/2009 | Kano et al. |
| 2009/0101511 A1 | 4/2009 | Lochtman et al. |
| 2009/0130424 A1 | 5/2009 | Tholen et al. |
| 2009/0130425 A1 | 5/2009 | Whitaker |
| 2009/0130479 A1 | 5/2009 | Detor et al. |
| 2009/0155617 A1 | 6/2009 | Kim et al. |
| 2009/0159451 A1 | 6/2009 | Tomantschger et al. |
| 2009/0283410 A1 | 11/2009 | Sklar et al. |
| 2010/0187117 A1 | 7/2010 | Lingenfelter et al. |
| 2010/0304063 A1 | 12/2010 | McCrea et al. |
| 2010/0304179 A1 | 12/2010 | Facchini et al. |
| 2010/0319757 A1 | 12/2010 | Oetting |
| 2011/0162970 A1 | 7/2011 | Sato |
| 2011/0180413 A1 | 7/2011 | Whitaker et al. |
| 2011/0186582 A1 | 8/2011 | Whitaker et al. |
| 2011/0256356 A1 | 10/2011 | Tomantschger et al. |
| 2011/0277313 A1 | 11/2011 | Soracco et al. |
| 2012/0088118 A1 | 4/2012 | Lomasney |
| 2012/0118745 A1 | 5/2012 | Bao |
| 2012/0135270 A1 | 5/2012 | Wilbuer et al. |
| 2012/0231574 A1 | 9/2012 | Wang |
| 2012/0282417 A1 | 11/2012 | Garcia et al. |
| 2013/0052343 A1 | 2/2013 | Dieny et al. |
| 2013/0071755 A1 | 3/2013 | Oguro |
| 2013/0075264 A1 | 3/2013 | Cummings et al. |
| 2013/0130057 A1 | 5/2013 | Caldwell et al. |
| 2013/0186852 A1 | 7/2013 | Dietrich et al. |
| 2013/0220831 A1 | 8/2013 | Vidaurre Heiremans et al. |
| 2013/0224008 A1 | 8/2013 | Cheung et al. |
| 2013/0323473 A1 | 12/2013 | Dietsch et al. |
| 2014/0163717 A1 | 6/2014 | Das et al. |
| 2014/0231266 A1 | 8/2014 | Sherrer et al. |
| 2015/0315716 A1 | 11/2015 | Whitaker |
| 2015/0322588 A1 | 11/2015 | Lomasney et al. |
| 2016/0002790 A1 | 1/2016 | Whitaker et al. |
| 2016/0002803 A1 | 1/2016 | Sklar |
| 2016/0002806 A1 | 1/2016 | Lomasney |
| 2016/0002813 A1 | 1/2016 | Lomasney |
| 2016/0024663 A1 | 1/2016 | Lomasney |
| 2016/0145850 A1 | 5/2016 | Cook et al. |
| 2016/0159488 A1 | 6/2016 | Roach et al. |
| 2016/0160863 A1 | 6/2016 | Roach et al. |
| 2017/0191177 A1 | 7/2017 | Whitaker et al. |
| 2017/0191179 A1 | 7/2017 | Lomasney |
| 2018/0016692 A1 | 1/2018 | Caldwell et al. |
| 2018/0016694 A1 | 1/2018 | Bao |
| 2018/0066375 A1 | 3/2018 | Morgan et al. |
| 2018/0071980 A1 | 3/2018 | Lomasney et al. |
| 2018/0245229 A1 | 8/2018 | Whitaker et al. |
| 2019/0309430 A1 | 10/2019 | Sklar |
| 2019/0360116 A1 | 11/2019 | Collinson et al. |
| 2020/0115998 A1 | 4/2020 | Lomasney |
| 2020/0131658 A1 | 4/2020 | Lomasney et al. |
| 2020/0173032 A1 | 6/2020 | Lomasney |

FOREIGN PATENT DOCUMENTS

| | | | |
|---|---|---|---|
| CN | 1380446 A | | 11/2002 |
| CN | 1924110 A | | 3/2007 |
| CN | 101113527 A | | 1/2008 |
| CN | 101195924 A | | 6/2008 |
| CN | 102317504 A | | 1/2012 |
| DE | 39 02 057 A1 | | 7/1990 |
| DE | 10 2004 006 441 A1 | | 12/2005 |
| GB | 2 324 813 A | | 11/1998 |
| JP | S47-2005 A | | 2/1972 |
| JP | S47-33925 A | | 11/1972 |
| JP | S52-109439 A | | 9/1977 |
| JP | 58-197292 A | | 11/1983 |
| JP | S60-97774 A | | 5/1985 |
| JP | S61-99692 A | | 5/1986 |
| JP | H01-132793 A | | 5/1989 |
| JP | H05-251849 A | | 9/1993 |
| JP | H06-196324 A | | 7/1994 |
| JP | 07-065347 A | | 3/1995 |
| JP | 2000-239888 A | | 9/2000 |
| JP | 2001-181893 A | | 7/2001 |
| JP | 2006-035176 A | | 2/2006 |
| JP | 2009-215590 A | | 9/2009 |
| KR | 10-2015-0132043 A | | 11/2015 |
| SU | 882417 A1 | | 11/1918 |
| SU | 36121 A1 | | 4/1935 |
| WO | 83/02784 A1 | | 8/1983 |
| WO | 95/14116 A1 | | 5/1995 |
| WO | 97/00980 A1 | | 1/1997 |
| WO | 2004/001100 A1 | | 12/2003 |
| WO | 2007/045466 A1 | | 4/2007 |
| WO | 2007/138619 A1 | | 12/2007 |
| WO | 2009/045433 A1 | | 4/2009 |
| WO | 2009/079745 A1 | | 7/2009 |
| WO | 2011/033775 A1 | | 3/2011 |
| WO | 2011/110346 A2 | | 9/2011 |
| WO | 2012/145750 A2 | | 10/2012 |
| WO | 2013/133762 A1 | | 9/2013 |

OTHER PUBLICATIONS

Blum, "The Structure and Properties of Alternately Electrodeposited Metals," paper presented at the Fortieth General Meeting of the American Electrochemical Society, Lake Placid, New York, 14 pages (Oct. 1, 1921).

Designing with Metals—Power Manufacturing, http://www.pwrmfg.com/power-manufacturing/technical-info/designing-with-metals/, printed Oct. 5, 2017 (2017), 3 pages.

Etminanfar et al., "Corrosion resistance of multilayer coatings of nanolayered Cr/Ni electrodeposited from Cr(III)—Ni(II) bath," Thin Solid Films, 5322-5327 (2012).

Georgescu et al., "Magnetic Behavior of [Ni/Co—Ni—Mg—N] x n Cylindrical Multilayers prepared by Magnetoelectrolysis," Phys. Stat. Sol. (a) 189, No. 3, 1051-1055 (2002).

Huang et al., "Characterization of Cr—Ni multilayers electroplated from a chromium(III)-nickel(II) bath using pulse current," *Scripta Materialia*, 57:61-64 (2007).

Huang et al., "Hardness variation and annealing behavior of a Cr—Ni multilayer electroplated in a trivalent chromium-based bath," Surface and Coatings Technology, 203, 3320-3324 (2009).

International Search Report and Written Opinion dated Aug. 7, 2014 for International Application No. PCT/US2014/030381.

Ivanov et al., "Corrosion resistance of compositionally modulated multilayered Zn—Ni alloys deposited from a single bath," *Journal of Applied Electrochemistry*, 33:239-244 (2003).

Kalu et al., "Cyclic voltammetric studies of the effects of time and temperature on the capacitance of electrochemically deposited nickel hydroxide," *Journal of Power Sources*, 92:163-167 (2001).

Kirilova et al., "Corrosion behaviour of Zn—Co compositionally modulated multilayers electrodeposited from single and dual baths," *Journal of Applied Electrochemistry*, 29:1133-1137 (1999).

Onoda et al., "Preparation of Amorphous/Crystalloid Soft Magnetic Multilayer Ni—Co—B Alloy Films by Electrodeposition," *Journal of Magnetism and Magnetic Materials*, 126(1-3):595-598 (Sep. 1, 1993).

Ross, "Electrodeposited Multilayer Thin Films," *Annual Review of Materials Science*, 24:159-188 (1994).

Rousseau et al., "Single-bath Electrodeposition of Chromium-Nickel Compositionally Modulated Multilayers (CMM) From a Trivalent Chromium Bath," *Plating and Surface Finishing*, pp. 106-110 (Sep. 1999).

Srivastava et al., "Corrosion resistance and microstructure of electrodeposited nickel-cobalt alloy coatings," Surface & Coatings Technology, 201, (2006) 3051-3060.

(56) References Cited

OTHER PUBLICATIONS

Tench et al., "Considerations in Electrodeposition of Compositionally Modulated Alloys," *J Electrochem. Soc.*, vol. 137, No. 10, 3061-3066 (Oct. 1990).
Thangaraj et al., "Corrosion behaviour of composition modulated multilayer Zn—Co electrodeposits produced using a single-bath technique," *Journal of Applied Electrochemistry*, 39:339-345 (Oct. 21, 2008).
Thangaraj et al., "Surface Modification by Compositionally Modulated Multilayered Zn—Fe Coatings," *Chinese Journal of Chemistry*, 26:2285-2291 (2008).
Tokarz et al., "Preparation, structural and mechanical properties of electrodeposited Co/Cu multilayers," *Physica Status Solidi*, 11:3526-3529 (Jun. 18, 2008).
Weil et al., "Properties of Composite Electrodeposits," Final Report, Contract No. DAAL03-87-K-0047, U.S. Army Research Office, 21 pages (Jan. 1, 1990).
Wilcox, "Surface Modification With Compositionally Modulated Multilayer Coatings," *The Journal of Corrosion Science and Engineering*, 6, Paper 52, 5 pages (submitted Jul. 6, 2003; fully published Jul. 26, 2004).
"Low-temperature iron plating," web blog article found at http:blog.sina.com.cn/s/blog_48ed0a9c0100024z.html, published Mar. 22, 2006, 3 pages. (with English translation).
Adams et al., "Controlling strength and toughness of multilayer films: A new multiscalar approach," *J. Appl. Phys.* 74(2):1015-1021, 1993.
Aizenberg et al., "Skeleton of *Euplectella* sp.: Structural Hierarchy from the Nanoscale to the Macroscale," *Science* 309:275-278, 2005.
Alfantazi et al., "Synthesis of nanocrystalline Zn—Ni alloy coatings," *JMSLD5* 15(15):1361-1363, 1996.
Atanassov et al., "Electrodeposition and properties of nickel-manganese layers," *Surface and Coatings Technology* 78:144-149, 1996.
Bakonyi et al., "Electrodeposited multilayer films with giant magnetoresistance (*GMR*): Progress and problems," *Progress in Materials Science* 55:107-245, 2010.
Bartlett et al., "Electrochemical deposition of macroporous platinum, palladium and cobalt films using polystyrene latex sphere templates," *Chem. Commun.*, pp. 1671-1672, 2000.
Beattie et al., "Comparison of Electrodeposited Copper-Zinc Alloys Prepared Individually and Combinatorially," *J. Electrochem. Soc.* 150(11):C802-C806, 2003.
Bird et al., "Giant Magnetoresistance in Electrodeposited Ni/Cu and Co/Cu Multilayers," *J. Electrochem. Soc.* 142(4):L65-L66, 1995.
Cohen et al., "Electroplating of Cyclic Multilayered Alloy (CMA) Coatings," *J. Electrochem. Soc.* 130(10):1987-1995, 1983.
Cowles, "High cycle fatigue in aircraft gas turbines—an industry perspective," *International Journal of Fracture* 80(2-3):147-163, 1996.
Despic et al., "Electrochemical Formation of Laminar Deposits of Controlled Structure and Composition," *J. Electrochem. Soc.* 136(6):1651-1657, 1989.
Dini et al. "On the High Temperature Ductility Properties of Electrodeposited Sulfamate Nickel," *Plating and Surface Finishing* 65(2):36-40, 1978.
Gasser et al., "Materials Design for Acoustic Liners: an Example of Tailored Multifunctional Materials," *Advanced Engineering Materials* 6(1-2):97-102, 2004.
Ghanem et al., "A double templated electrodeposition method for the fabrication of arrays of metal nanodots," *Electrochemistry Communications* 6:447-453, 2004.
Grimmett et al., "Pulsed Electrodeposition of Iron-Nickel Alloys," *J. Electrochem. Soc.* 137(11):3414-3418, 1990.
Hariyanti, "Electroplating of Cu—Sn Alloys and Compositionally Modulated Multilayers of Cu—Sn—Zn—Ni Alloys on Mild Steel Substrate," Master of Science Thesis, University of Science, Malaysia, Penang, Malaysia, 2007.
Harris et al., "Improved Single Crystal Superalloys, CMSX-4® (SLS)[La+Y] and CMSX-486®," *TMS (The Minerals, Metals & Materials Society), Superalloys*, p. 45-52, 2004.
Igawa et al., "Fabrication of SiC fiber reinforced SiC composite by chemical vapor infiltration for excellent mechanical properties," *Journal of Physics and Chemistry of Solids* 66:551-554, 2005.
Jeong et al., "The Effect of Grain Size on the Wear Properties of Electrodeposited Nanocrystalline Nickel Coatings," *Scripta Mater.* 44:493-499, 2001.
Jia et al., "LIGA and Micromolding" Chapter 4, *The MEMS Handbook*, 2nd edition, CRC Press, Boca Raton, Florida, Edited by Mohamed Gad-el-Hak, 2006.
Kaneko et al., "Vickers hardness and deformation of Ni/Cu nano-multilayers electrodeposited on copper substrates," Eleventh International Conference on Intergranular and Interphase Boundaries 2004, *Journal of Material Science* 40:3231-3236, 2005.
Karimpoor et al., "Tensile Properties of Bulk Nanocrystalline Hexagonal Cobalt Electrodeposits," *Materials Science Forum* 386-388:415-420, 2002.
Keckes et al., "Cell-wall recovery after irreversible deformation of wood," *Nature Materials* 2:810-814, 2003.
Kockar et al., "Effect of potantiostatic waveforms on properties of electrodeposited NiFe alloy films," *Eur. Phys. J.* B(42):497-501, 2004.
Kruth et al., "Progress in Additive Manufacturing and Rapid Prototyping" *CIRP Annals* 47(2):525-540, 1998.
Lashmore et al., "Electrodeposited Cu—Ni Textured Superlattices," *J. Electrochem. Soc.* 135(5):1218-1221, 1988.
Lashmore et al., "Electrodeposited Multilayer Metallic Coatings," *Encyclopedia of Materials Science and Engineering*, Supp. vol. 1:136-140, 1988.
Leisner et al., "Methods for electrodepositing composition-modulated alloys," *Journal of Materials Processing Technology* 58:39-44, 1996.
Leith et al., "Characterization of Flow-Induced Compositional Structure in Electrodeposited NiFe Composition-Modulated Alloys" *J. Electrochem. Soc.* 145(8):2827-2833, 1998.
Lekka et al., "Corrosion and wear resistant electrodeposited composite coatings," *Electrochimica Acta* 50:4551-4556, 2005.
Lewis et al., "Stability in thin film multilayers and microlaminates: the role of free energy, structure, and orientation at interfaces and grain boundaries," *Scripta Materialia* 48:1079-1085, 2003.
Low et al., "Electrodeposition of composite coatings containing nanoparticles in a metal deposit," *Surface & Coating Technology* 201:371-383, 2006.
Malone, "New Developments in Electroformed Nickel-Based Structural Alloys," *Plating and Surface Finishing* 74(1):50-56, 1987.
Marchese, "Stress Reduction of Electrodeposited Nickel," *Journal of the Electrochemical Society* 99(2):39-43, 1952.
Meng et al., "Fractography, elastic modulus, and oxidation resistance of Novel metal-intermetallic $Ni/Ni_3Al$ multilayer films," *J. Mater. Res.* 17(4):790-796, 2002.
Naslain et al., "Synthesis of highly tailored ceramic matrix composites by pressure-pulsed CVI," *Solid State Ionics* 141-142:541-548, 2001.
Naslain, "The design of the fibre-matrix interfacial zone in ceramic matrix composites," *Composites Part A* 29A:1145-1155, 1998.
Nicholls, "Advances in Coating Design for High-Performance Gas Turbines," *MRS Bulletin*, p. 659-670, 2003.
Parkin et al., "Oscillations in Exchange Coupling and Magnetoresistance in Metallic Superlattice Structures: Co/Ru, Co/Cr, and Fe/Cr," *Physical Review Letters* 64(19):2304-2307, 1990.
Pilone et al., "Model of Multiple Metal Electrodeposition in Porous Electrodes," *Journal of the Electrochemical Society* 153(5):D85-D90, 2006.
Podlaha et al. "Induced Codeposition: I. An Experimental Investigation of Ni—Mo Alloys," *J. Electrochem. Soc.* 143(3):885-892, 1996.
Saleh et al., "Effects of electroplating on the mechanical properties of stereolithography and laser sintered parts," *Rapid Prototyping Journal* 10(5)305-315, 2004.
Sanders et al., "Mechanics of hollow sphere foams," *Materials Science and Engineering* A347:70-85, 2003.

(56) References Cited

OTHER PUBLICATIONS

Sartwell et al., "Replacement of Chromium Electroplating on Gas Turbine Engine Components Using Thermal Spray Coatings," Report No. NRL/MR/6170-May 8890, Naval Research Laboratory, 2005. (207 pages).
Schwartz, "Multiple-Layer Alloy Plating," ASM Handbook 5: Surface Engineering, p. 274-276, 1994.
Sherik, "Synthesis, Structure and Properties of Electrodeposited Bulk Nanocrystalline Nickel," Master's Thesis, Queen's University, Ontario, Canada, 1993.
Shishkovski, "Laser synthesis of functionally graded meso structures and bulk products," Fizmatlit, Moscow, Russia, pp. 30-38, 2009. (with English Abstract).
Simunovich et al., "Electrochemically Layered Copper-Nickel Nanocomposites with Enhanced Hardness," *J. Electrochem. Soc.* 141(1):L10-L11, 1994.
Sperling et al., "Correlation of stress state and nanohardness via heat treatment of nickel-aluminide multilayer thin films," *J. Mater. Res.* 19(11):3374-3381, 2004.
Stephenson, Jr., "Development and Utilization of a High Strength Alloy for Electroforming," *Plating* 53(2): 183-192, 1966.
Suresh, "Graded Materials for Resistance to Contact Deformation and Damage," *Science* 292:2447-2451, 2001.
Switzer et al., "Electrodeposited Ceramic Superlattices," *Science* 247(4941):444-446, 1990.
Tench et al., "Enhanced Tensile Strength for Electrodeposited Nickel-Copper Multilayer Composites," *Metallurgical Transactions A* (15A):2039-2040, 1984.
Touchstone Research Laboratory, Ltd., Material Safety Data Sheet, CFOAM Carbon Foams, 2008. (4 pages).

Vill et al., "Mechanical Properties of Tough Multiscalar Microlaminates," *Acta metall. mater.* 43(2):427-437, 1995.
Voevodin et al., "Superhard, functionally gradient, nanolayered and nanocomposite diamond-like carbon coatings for wear protection," *Diamond and Related Materials* 7:463-467, 1998.
Wearmouth et al., "Electroforming with Heat-Resistant, Sulfur-Hardened Nickel," *Plating and Surface Finishing* 66(10):53-57, 1979.
Weil et al., "Pulsed Electrodeposition of Layered Brass Structures," *Metallurgical Transactions A* 19A:1569-1573, 1988.
Wikipedia, "Gold," URL= http://en.wikipedia.org/wiki/Gold, version modified Nov. 3, 12 pages, 2008.
Wikipedia, "Silver," URL= http://en.wikipedia.org/wiki/Silver, version modified Nov. 3, 12 pages, 2008.
Wu et al., "Preparation and characterization of superhard $CN_x$/ZrN multilayers," *J. Vac. Sci. Technol. A* 15(3):946-950, 1997.
Yahalom et al., "Formation of composition-modulated alloys by electrodeposition," *Journal of Materials Science* 22:499-503, 1987.
Yang et al., "Effects of SiC sub-layer on mechanical properties of Tyranno-SA/SiC composites with multiple interlayers," *Ceramics International* 31:525-531, 2005.
Yang et al., "Enhanced elastic modulus in composition-modulated gold-nickel and copper-palladium foils," *Journal of Applied Physics* 48(3):876-879, 1977.
Yogesha et al., "Optimization of deposition conditions for development of high corrosion resistant Zn—Fe multilayer coatings," *Journal of Materials Processing Technology* 211:1409-1415, 2011.
Zabludovsky et al., "The Obtaining of Cobalt Multilayers by Programme-controlled Pulse Current," Transactions of the Institute of Metal Finishing 75(5):203-204, 1997.
U.S. Appl. No. 16/496,925, filed Sep. 23, 2019.
U.S. Appl. No. 16/606,723, filed Oct. 18, 2019.

\* cited by examiner

NICKEL-CHROMIUM NANOLAMINATE COATING HAVING HIGH HARDNESS

CROSS-REFERENCE TO RELATED APPLICATIONS

This application is a continuation of U.S. patent application Ser. No. 14/855,252, filed Sep. 15, 2015, which is a continuation of PCT/US14/30381, filed Mar. 17, 2014, which claims the benefit of U.S. Provisional Application No. 61/802,112, filed Mar. 15, 2013, each of which is incorporated herein by reference in its entirety.

BACKGROUND

Electrodeposition is recognized as a low-cost method for forming a dense coating on a variety of conductive materials, including metals, alloys, conductive polymers and the like. Electrodeposition has also been successfully used to deposit nanolaminated coatings on non-conductive material such as non-conductive polymers by incorporating sufficient materials into the non-conductive polymer to render it sufficiently conductive or by treating the surface to render it conductive, for example by electroless deposition of nickel, copper, silver, cadmium etc. a variety of engineering applications.

Electrodeposition has also been demonstrated as a viable means for producing laminated and nanolaminated coatings, materials and objects, in which the individual laminate layers may vary in the composition of the metal, ceramic, organic-metal composition, and/or microstructure features. Laminated coatings and materials, and in particular nano-laminated metals, are of interest for a variety of purposes, including structural, thermal, and corrosion resistance applications because of their unique toughness, fatigue resistance, thermal stability, wear (abrasion resistance and chemical properties.

SUMMARY

The present disclosure is directed to the production NiCr nanolaminated materials having a high hardness. The materials have a variety of uses including, but not limited to, the preparation of coatings that protect an underlying substrate, and which may also increase its strength. In one embodiment hard NiCr coatings and materials are wear/abrasion resistant and find use as wear resistant coatings in tribological applications. In another embodiment the hard NiCr coatings prevent damage to the underlying substrates. Where the NiCr materials are applied as a coating that is more noble then the underlying material upon which it is placed, it may function as a corrosion resistant barrier coating.

DESCRIPTION

1.1 Overview

The present disclosure is directed to the method of producing laminate materials and coatings comprising layers each comprising nickel or nickel and chromium. The materials, which are prepared by electrodeposition, have a Vickers hardness value up to about 750 without the addition of other elements or heat treatments.

In one embodiment the disclosure is directed to an electrodeposition processes for forming a multilayered nickel and chromium containing coating on a substrate or mandrel comprising:

(a) providing one or more electrolyte solutions comprising a nickel salt and/or a chromium salt;
(b) providing a conductive substrate or mandrel for electrodeposition;
(c) contacting at least a portion of the substrate or mandrel with one of said one or more electrolyte solutions; and
(d) passing a first electric current through the substrate or mandrel, to deposit a first layer comprising either nickel or an alloy thereof on the surface; and passing a second electric current through the substrate, to deposit second layer comprising a nickel-chromium alloy on the surface;
(e) repeating step (d) two or more times thereby producing a multilayered coating having first layers of nickel or an alloy thereof and second layers of a nickel-chromium alloy on at least a portion of the surface of the substrate or mandrel.

The method may further comprise the step of separating said substrate or mandrel from the coating, where the coating forms an object comprised of the laminate material.

The high hardness coating produced by the process typically has alternating first and second layers. The first layers are each from about 25 nm to about 75 nm thick, and comprises from about 92% to about 99% nickel, with the balance typically comprising chromium. The second layers are each from about 125 nm to about 175 nm thick, and typically comprise from about 10% to about 21% chromium by weight with the balance typically comprising nickel.

1.2 Definitions

"Laminate" or "laminated" as used herein refers to materials that comprise a series of layers, including nanolaminated materials.

"Nanolaminate" or "nanolaminated" as used herein refers to materials that comprise a series of layers less than 1 micron.

All compositions given as percentages are given as percent by weight unless stated otherwise.

1.3 Nanolaminate NiCr Coatings

1.3.1 Nanolaminate NiCr Materials and Coatings and Methods of Their Preparing Electrodeposition has been demonstrated as a viable means for producing nanolaminated metal materials and coatings in which the individual laminate layers may vary in the composition or structure of the metal components. In addition, electrodeposition permits the inclusion of other components, such as ceramic particles and organic-metal components.

Multi-laminate materials having layers with different compositions can be realized by moving a mandrel or substrate from one bath to another and electrodepositing a layer of the final material. Each bath represents a different combination of parameters, which may be held constant or varied in a systematic manner. Accordingly, laminated materials may be prepared by alternately electroplating a substrate or mandrel in two or more electrolyte baths of differing electrolyte composition and/or under differing plating conditions (e.g., current density and mass transfer control). Alternatively, laminated materials may be prepared using a single electrolyte bath by varying the electrodeposition parameters such as the voltage applied, the current density, mixing rate, substrate or mandrel movement (e.g., rotation) rate, and/or temperature. By varying those and/or other parameters, laminated materials having layers with differing metal content can be produced in a single bath.

The present disclosure provides a process for forming a multilayered nickel and chromium containing coating on a substrate or mandrel by electrodeposition comprising:

(a) providing one or more electrolyte solutions (baths) comprising a nickel salt and/or a chromium salt;

(b) providing a conductive substrate or mandrel suitable for electrodeposition;

(c) contacting at least a portion of the substrate or mandrel with one of said one or more electrolyte solutions;

(d) passing a first electric current through the substrate or mandrel, to deposit a first layer comprising either nickel or an alloy thereof on the substrate or mandrel; and passing a second electric current through the substrate, to deposit second layer comprising a nickel-chromium alloy on the surface; and (e) repeating step (d) two or more times thereby producing a multilayered coating having first layers of nickel or an alloy thereof and second layers of a nickel-chromium alloy on at least a portion of the surface of the substrate or mandrel.

Where separate baths are employed to deposit the first and second layers step (d) includes contacting at least a portion of the substrate or mandrel that having the first layer deposited on it with a second of said one or more electrolyte solutions (baths) prior to passing a second electric current through the substrate, to deposit second layer comprising a nickel-chromium alloy on the surface.

Where the electroplated material is desired as an object that is "electroformed" or as a material separated from the substrate or mandrel, the method may further comprise a step of separating the substrate or mandrel from the electroplated coating. Where a step of separating the electroplated material form the substrate or mandrel is to be employed, the use of electrodes (mandrel) that do not form tight bonds with the coating are desirable, such as titanium electrode (mandrel).

In one embodiment, where a single bath is used to deposit the first and second layers, providing one or more electrolyte solutions comprises providing a single electrolyte solution comprising a nickel salt and a chromium salt, and passing an electric current through said substrate or mandrel comprises alternately pulsing said electric current for predetermined durations between said first electrical current density and said second electrical current density; where the first electrical current density is effective to electrodeposit a first composition comprising either nickel or an alloy of nickel and chromium; and the second electrical current density is effective to electrodeposit a second composition comprising nickel and chromium; the process is repeated to producing a multilayered alloy having alternating first and second layers on at least a portion of said surface of the substrate or mandrel.

Regardless of whether the laminated material is produced by electroplating in more than one bath (e.g., alternately plating in two different baths) or in a single baths, the electrolytes employed may be aqueous or non-aqueous. Where aqueous baths are employed they may benefit from the addition of one or more, two or more, or three or more complexing agents, which can be particularly useful in complexing chromium in the +3 valency. Among the complexing agents that may be employed in aqueous baths are one or more of citric acid, ethylendiaminetetraacetic acid (EDTA), triethanolamine (TEA), ethylenediamine (En), formic acid, acetic acid, hydroxyacetic acid, malonic acid, or an alkali metal salt or ammonium salt of any thereof. In one embodiment the electrolyte used in plating comprises a $Cr^{+3}$ salt (e.g., a tri-chrome plating bath). In another embodiment the electrolyte used in plating comprises either $Cr^{+3}$ and one or more complexing agents selected from citric acid, formic acid, acetic acid, hydroxyacetic acid, malonic acid, or an alkali metal salt or ammonium salt of any thereof. In still another embodiment the electrolyte used in plating comprises either $Cr^{+3}$ and one or more amine containing complexing agents selected from EDTA, triethanolamine (TEA), ethylenediamine (En), or salt of any thereof.

The temperature at which the electrodeposition process is conducted may alter the composition of the electrodeposit. Where the electrolyte(s) employed are aqueous, the electrodeposition process will typically be kept in the range of about 18° C. to about 45° C. (e.g., 18° C. to about 35° C.) for the deposition of both the first and second layers.

Both potentiostatic and galvanostatic control of the electrodeposition of the first and second layers is possible regardless of whether those layers are applied from different electrolyte baths or from a single bath. In one embodiment, a single electrolyte bath is employed and the first electrical current ranges from approximately 10 $mA/cm^2$ to approximately 100 $mA/cm^2$ for the deposition of the first layers. In that embodiment the second electrical current ranges from approximately 100 $mA/cm^2$ to approximately 500 $mA/cm^2$ for the deposition of the second layers.

Plating of each layer may be conducted either continuously or by pulse or pulse reverse plating. In one embodiment, the first electrical current is applied to the substrate or mandrel in pulses ranging from approximately 0.001 second to approximately 1 seconds. In another embodiment, the second electrical current is applied to the substrate or mandrel in pulses ranging from approximately 1 second to approximately 100 seconds. In another embodiment, wherein alternating Ni and Cr containing layer are electrodeposited, the electrodeposition may employ periods of DC plating followed by periods of pulse plating.

In one embodiment, plating of the nearly pure nickel layer may be conducted either by direct current or by pulse plating. In one such embodiment, the first electrical current is applied to the substrate or mandrel in pulses ranging from approximately 0.001 second to approximately 1 seconds. In another embodiment, the second electrical current is applied to the substrate or mandrel in pulses ranging from approximately 1 second to approximately 100 seconds. In another embodiment, wherein alternating Ni and Cr containing layer are electrodeposited, the electrodeposition may employ periods of DC plating followed by periods of pulse plating.

To ensure adequate binding of NiCr coatings to substrates it is necessary to preparing the substrate for the electrodeposition (e.g., the surface must be clean, electrochemically active, and the roughness determined to be in in an adequate range). In addition, depending on the substrate it may be desirable to employ a strike layer, particularly where the substrate is a polymer or plastic that has previously been rendered conductive by electroless plating or by chemical conversion of its surface, as in the case for zincate processing of aluminum, which is performed prior to the electroless or electrified deposition. Where a strike layer is applied, it may be chosen from an of a number of metals including, but not limited to, copper nickel, zinc, cadmium, platinum etc. In one embodiment, the strike layer is nickel or a nickel alloy from about 100 nm to about 1000 nm or about 250 nm to about 2500 nm thick. In another embodiment, a first layer applied to a substrate may act as a strike layer, in which case it is applied so that it is directly in contact with a substrate, or in the case of a polymeric substrate rendered conductive by electroless deposition of a metal, directly in contact with the electroless metal layer. Accordingly, in one embodiment a first layer is in contact with the substrate or mandrel. In another embodiment, the second layer is in contact with the substrate or mandrel.

The hard nanolaminate materials, such as coatings, produced by the processes described above will typically comprise alternating first and second layers in addition to any strike layer applied to the substrate. The first layers each having a thickness independently selected from about 25 nm to about 75 nm, from about 25 nm to about 50 nm, from about 35 nm to about 65 nm, from about 40 nm to about 60 nm, or from about 50 nm to about 75 nm. The second layers having thickness independently from about 125 nm to about 175 nm, from about 125 nm to about 150 nm, from about 135 nm to about 165 nm, from about 140 nm to about 160 nm, or from about 150 nm to about 175 nm.

First layers may typically comprise greater than about 92%, 93%, 94%, 95%, 96%, 97%, 98% or 99% nickel. The balance of first layers may be chromium, or may be comprised of one or more, two or more, three or more, or four or more elements selected independently for each first layer from C, Co, Cr, Cu, Fe, In, Mn, Nb, Sn, W, Mo, and P. In one embodiment the balance of the first layers are each an alloy comprising chromium and one or more elements selected independently for each layer from C, Co, Cu, Fe, Ni, W, Mo and/or P.

Second layers may typically comprise about 5% to about 40%, about 5% to about 21%, about 10% to about 14%, about 12% to about 16%, about 14% to about 18%, about 16 to about 21%, about 18% to about 21% or about 18% to about 40% chromium. The balance of second layers may be nickel, or may be comprised of nickel and one or more, two or more, three or more, or four or more elements selected independently for each second layer from C, Co, Cu, Fe, In, Mn, Mo, P, Nb, Ni and W. In one embodiment the balance of the second layers is an alloy comprising nickel and one or more elements selected independently for each layer from C, Co, Cr, Cu, Mo, P, Fe, Ti and W.

In one embodiment, for an element to be considered as being present, it is contained in the electrodeposited material in non-trivial amounts. In such an embodiment a trivial amount may be less than about 0.005%, 0.01%, 0.05% or 0.1% by weight. Accordingly, non-trivial amounts may be greater than 0.005%, 0.01%, 0.05% or 0.1% by weight.

Laminated or nanolaminated materials including coatings prepared as described herein comprise two or more, three or more, four or more, six or more, eight or more, ten or more, twenty or more, forty or more, fifty or more, 100 or more, 200 or more, 500 or more or 1000 or more alternating first and second layers. In such embodiments, the first and second layers are counted as pairs of first and second layers. Accordingly, two layers each having a first layer and second layer, consists of a total of four laminate layers (i.e., each layer is counted separately).

In addition to the methods of preparing hard NiCr materials, the present disclosure is directed to hard NiCr materials, including hard NiCr coatings and electroformed NiCr objects prepared by the methods described above.

1.3.2 Properties and Applications of Nanolaminate NiCr Coatings

1.3.2.1 Surface Properties

The hard NiCr materials described herein have a number of properties that render them useful for both industrial and decorative purposes. The coatings applied are self-leveling and depending on the exact composition of the outermost layer can be reflective to visible light. Accordingly, the hard NiCr materials may serve as a replacement for chrome finishes in a variety of application where reflective metal surfaces are desired. Such applications include, but are not limited to, mirrors, automotive details such as bumpers or fenders, decorative finishes and the like.

In one embodiment the laminated NiCr coatings described herein have a surface roughness (arithmetical mean roughness or Ra) of less than 0.1 micrometer (e.g., 0.09, 0.08, 0.07, or 0.05 microns).

1.3.2.2 Hardness

Through the use of nanolamination it is possible to increase the hardness of NiCr alloys above the hardness observed for homogeneous electrodeposited NiCr compositions (alloys) that have not been heat treated and have the same thickness and average composition as the hard NiCr nanolaminate material. Then laminated NiCr materials have a Vickers microhardness as measured by ASTM E384-11e1 of 550-750, 550-600, 600-650, 650-700, 700-750 or greater than 750 but less than about 900, 950, 1000 or 1100 units without heat treatment. The use of heat treatments in the presence of other elements such as P, C in the first and second layers can increase the hardness of the coating.

In another embodiment the NiCr materials described herein comprising alternating first and second layers, where the first layers that comprise nickel or comprise a nickel-chromium alloy, and the second layers comprise a nickel-chromium alloy. Such materials have a Vickers microhardness as measured by ASTM E384-11e1 of 550-750, 550-600, 600-650, 650-700, 700-750, 750-800, or 800-850 without heat treatment.

In one embodiment, the NiCr materials described herein consist of alternating first and second layers, where the first layers consist of a nickel or a nickel-chromium alloy and second layers consist of a nickel-chromium alloy. Such materials have a Vickers microhardness as measured by ASTM E384-11e1 of 550-750, 550-600, 600-650, 650-700, 700-750, 750-800 or 800-850 without heat treatment.

1.3.2.3 Abrasion Resistance

Due to their high hardness the laminated NiCr materials are useful as a means of providing resistance to abrasion, especially when they are employed as coatings. In one embodiment, the nanolaminate NiCr coatings that have not been heat treated display 5%, 10%, 20%, 30% or 40% less loss of weight than homogeneous electrodeposited NiCr compositions (alloys) that have not been heat treated and have the same thickness and average composition as the hard NiCr nanolaminate material when subject to testing on a Taber Abraser equipped with CS-10 wheels and a 250 g load and operated at room temperature at the same speed for both samples (e.g., 95 RPM). In another embodiment, the laminated NiCr compositions display a higher abrasion resistance when subject to testing under ASTM D4060 than their homogeneous counterpart (e.g., homogeneous electrodeposited counterpart having the average composition of the laminated NiCr composition).

1.3.2.4 Corrosion Protection

The behavior of organic, ceramic, metal and metal-containing coatings in corrosive environments depends primarily on their chemistry, microstructure, adhesion, their thickness and galvanic interaction with the substrate to which they are applied.

NiCr generally acts as barrier coating being more electronegative (more noble) than substrates to which it will be applied, such as iron-based substrates. As such, NiCr coatings act by forming a barrier to oxygen and other agents (e.g., water, acid, base, salts, and/or $H_2S$) causing corrosive damage, including oxidative corrosion. When a barrier coating that is more noble than its underlying substrate is marred or scratched, or if coverage is not complete, the coatings will not work and may accelerate the progress of substrate corrosion at the substrate-coating interface, resulting in preferential attack of the substrate. Consequently, coatings prepared from the hard NiCr coatings described herein offer advantages over softer NiCr nanolaminate coatings as they are less likely to permit a scratch to reach the surface of a corrosion susceptible substrate. Another advantage offered by the hard NiCr laminate coatings described herein are their fully dense structure, which lacks any significant pores or microcracks that extend from the surface of the coating to the substrate. To avoid the formation of microcracks the first layer can be a nickel rich ductile layer that hinders the formation of continuous cracks from the coating surface to the substrate. To the extent that microcracks occur in the high chromium layers, they are small and tightly spaced. The lack of pores and continuous microcracks more effectively prohibits corrosive agents from reaching the underling substrate and renders the laminate NiCr coatings described herein more effective as a barrier coating to oxidative damage of a substrate than an equivalent thickness of electrodeposited chromium.

2.0 Certain Embodiments

1. A process for forming a multilayered nickel and chromium containing coating on a surface of a substrate or mandrel by electrodeposition comprising:
    (a) providing one or more electrolyte solutions comprising a nickel salt and/or a chromium salt;
    (b) providing a conductive substrate or mandrel for electrodeposition;
    (c) contacting at least a portion of the surface of the substrate or mandrel with one of said one or more electrolyte solutions;
    (d) passing a first electric current through the substrate or mandrel, to deposit a first layer comprising either nickel, or an alloy thereof, on the substrate or mandrel; and passing a second electric current through the substrate, to deposit a second layer comprising a nickel-chromium alloy on the surface;
    (e) repeating step (d) two or more times thereby producing a multilayered coating having first layers of nickel, or an alloy thereof, and second layers of a nickel-chromium alloy on at least a portion of the surface of the substrate or mandrel; and
optionally separating the substrate or mandrel from the coating.

2. The process of embodiment 1, wherein:
    said providing one or more electrolyte solutions comprise providing an electrolyte solution comprising a nickel salt and a chromium salt;
    passing an electric current through said substrate or mandrel comprises alternately pulsing said electric current for predetermined durations between said first electrical current and said second electrical current (e.g., pulsing for predetermined durations at a first electrical current value and then at a second electrical current value);
    where said first electrical current is effective to electrodeposit a first composition comprising nickel or an alloy of nickel and chromium; and
    where said second electrical current is effective to electrodeposit a second composition comprising nickel and chromium;
    thereby producing a multilayered alloy having alternating first and second layers, said first layer comprising either nickel, or an alloy thereof, and said second layer comprising a nickel-chromium alloy on at least a portion of the surface of the substrate or mandrel.

3. The process of embodiment 1 or embodiment 2, wherein at least one of said one or more electrolyte solutions is an aqueous bath (e.g., aqueous solution) comprising one or more complexing agents.

4. The process of embodiment 3, wherein said complexing agent is selected from one or more, two or more, or three or more of citric acid, ethylenediaminetetraacetic acid (EDTA), triethanolamine (TEA), ethylenediamine (En), formic acid, acetic acid, hydroxyacetic acid, malonic acid or an alkali metal or ammonium salt of any thereof.

5. The process of any of embodiments 1-4, wherein said passing said first electric current through said substrate or mandrel and passing said second electric current through said substrate or mandrel are conducted at a temperature ranging from approximately (about) 18° C. to approximately (about) 35° C., or from approximately (about) 18° C. to approximately (about) 45° C.

6. The process of any of embodiments 1-5, wherein the first electric current has a range from approximately (about) 10 mA/cm$^2$ to approximately (about) 100 mA/cm$^2$.

7. The process of any of embodiments 1-6, wherein the second electric current has a range from approximately (about) 100 mA/cm$^2$ to approximately (about) 500 mA/cm$^2$.

8. The process of any of embodiments 1-7, wherein the first electrical current is applied to the substrate or mandrel in pulses ranging from approximately (about) 0.001 second to approximately (about) 1.00 seconds.

9. The process of any of embodiments 1-8, wherein the second electrical current is applied to the substrate or mandrel in pulses ranging from approximately (about) 0.001 second to approximately (about) 1.00 seconds.

10. The process of any of embodiments 1-9, wherein said first layer is in contact with said substrate or mandrel.

11. The process of any of embodiments 1-9, wherein said second layer is in contact with said substrate or mandrel.

12. The process of any of embodiments 1-11, wherein said first layer has a thickness from about 25 nm to about 75 nm, from about 25 nm to about 50 nm, from about 35 nm to about 65 nm, from about 40 nm to about 60 nm, or from about 50 nm to about 75 nm.

13. The process of any of embodiments 1-12, wherein said second layer has a thickness from about 125 nm to about 175 nm, from about 125 nm to about 150 nm, from about 135 nm to about 165 nm, from about 140 nm to about 160 nm, or from about 150 nm to about 175 nm.

14. The process of any of embodiments 1-13, wherein said first layer comprises greater than about 92%, 93%, 94%, 95%, 96%, 97%, 98% or 99% nickel by weight and a balance of other elements.

15. The process of any of embodiments 1-14, wherein said second layer comprises about 10% to about 21%, about 10% to about 14%, about 12% to about 16%, about 14% to about 18%, about 16% to about 21%, about 18% to about 21% or about 18% to about 40% chromium by weight and a balance of other elements.

16. The process of embodiment 14, wherein said first layer comprises greater than about 92%, 93%, 94%, 95%, 96%, 97%, 98% or 99% nickel, and the balance of the first layer is chromium.

17. The process of embodiment 15, wherein said second layer comprises about 10% to about 21%, about 10% to about 14%, about 12% to about 16%, about 14% to about 18%, about 16% to about 21%, about 18% to about 21% or about 18% to about 40% chromium, and the balance of the second layer is nickel.

18. The process of any of embodiments 1-15, wherein the first layer and/or the second layer comprises one or more, two or more, three or more or four or more elements selected independently for each layer from the group consisting of C, Co, Cu, Fe, In, Mn, Nb, W, Mo, and P.

19. The process of embodiment 18, wherein said elements selected independently for each layer are each present in a non-trivial amount greater than 0.005%, 0.01%, 0.05% or 0.1% by weight.

20. The process of any of embodiments 1-19, comprising two or more, three or more, four or more, six or more, eight or more, ten or more, twenty or more, forty or more, fifty or more, 100 or more, 200 or more, 500 or more or 1000 or more alternating first layers and second layers.

21. An object or coating comprising a multilayered nickel and chromium containing coating prepared by the method of any of embodiments 1-20.

22. An object or coating comprising a multilayered coating comprising a plurality of alternating first layers of nickel or an alloy comprising nickel, and second layers of an alloy comprising nickel and chromium, and optionally comprising a substrate.

23. The object or coating of embodiment 22, wherein said multilayer coating comprises two or more, three or more, four or more, six or more, eight or more, ten or more, twenty or more, forty or more, fifty or more, 100 or more, 200 or more, 500 or more or 1000 or more alternating first and second layers.

24. The object or coating of any of embodiments 22-23, wherein said first layers have a thickness from about 25 nm to about 75 nm, from about 25 nm to about 50 nm, from about 35 nm to about 65 nm, from about 40 nm to about 60 nm or from about 50 nm to about 75 nm.

25. The object or coating of any of embodiments 22-24, wherein said second layers have a thickness from about 125 nm to about 175 nm, from about 125 nm to about 150 nm, from about 135 nm to about 165 nm, from about 140 nm to about 160 nm or from about 150 nm to about 175 nm.

26. The object or coating of any of embodiments 22-25, wherein said first layer is in contact with said substrate or mandrel.

27. The object or coating of any of embodiments 22-26, wherein said second layer is in contact with said substrate or mandrel.

28. The object or coating of any of embodiments 22-27, wherein said first layer comprises greater than about 92%, 93%, 94%, 95%, 96%, 97%, 98% or 99% nickel.

29. The object or coating of any of embodiments 22-28, wherein each second layer comprises chromium in a range independently selected from about 10% to about 21%, about 10% to about 14%, about 12% to about 16%, about 14% to about 18%, about 16% to about 21%, about 18% to about 21% or 18%-40% chromium.

30. The object or coating of embodiment 28, wherein said first layer comprises greater than about 92%, 93%, 94%, 95%, 96%, 97%, 98% or 99% nickel and the balance of the first layer is chromium.

31. The object or coating of embodiment 29, wherein said second layer comprises greater than about 10% to about 21%, about 10% to about 14%, about 12% to about 16%, about 14% to about 18%, about 16% to about 21%, about 18% to about 21% or about 18% to about 40% chromium and the balance of the second layer is nickel.

32. The object or coating of any of embodiments 22-31, wherein said first and/or second layer comprises one or more, two or more, three or more, or four or more elements selected independently from the group consisting of C, Co, Cu, Fe, In, Mn, Nb W, Mo, and P.

33. The object or coating of any of embodiments 22-31, wherein each of said elements are present at concentrations of 0.01% or greater.

34. The object or coating of any of embodiments 22-33, comprising two or more, three or more, four or more, six or more, eight or more, ten or more, twenty or more, forty or more, fifty or more, 100 or more, 200 or more, 500 or more or 1000 or more alternating first and second layers.

35. The object or coating of any of embodiments 22-34, wherein said first layers consist of nickel or a nickel chromium alloy and said second layers consist of a nickel-chromium alloy and wherein said coating has a Vickers microhardness as measured by ASTM E384-11e1 of about 550 to about 750, about 550 to about 600, about 600 to about 650, about 650 to about 700, about 700 to about 750, about 750 to about 800 or about 800 to about 850 without heat treatment.

36. The object or coating of any of embodiments 22-34, wherein said substrate comprises one or metals.

37. The object or coating of embodiment 36, wherein said substrate comprises one or more metals or other elements selected from the group consisting of C, Co, Cu, Fe, In, Mn, Nb, W, Mo, and P.

38. The object or coating of embodiment 37, wherein said substrate is selected from iron or steel.

39. The object or coating of any of embodiments 22-38, wherein said coating has fewer cracks, pores, or microcracks than a monolithic coating of chromium of substantially the same thickness (e.g., an electrodeposited coating of chromium of substantially the same thickness deposited under conditions suitable for deposition of second layers but consisting of chromium).

40. The object or coating of any of embodiments 22-39, wherein said object resists corrosion of said substrate caused by exposure to one or more of water, air, acid, base, salt water, and/or H2S.

41. The object or coating of any of embodiments 36-40, wherein said first layers consists of nickel, or a nickel chromium alloy, and second layers consist of a nickel-chromium alloy, and wherein said coating has a Vickers microhardness as measured by ASTM E384-11e1 of about 550 to about 750, about 550 to about 600, about 600 to about 650, about 650 to about 700, about 700 to about 750, about 750 to about 800 or about 800 to about 850 without heat treatment.

42. The process of any of embodiments 1-20, further comprising separating said multilayered coating from said substrate or mandrel to form a multilayered object.

The invention claimed is:

1. An object comprising:
a nanolaminate coating on at least a portion of a surface of a substrate, the nanolaminate coating comprising a plurality of alternating first layers of a first nickel-chromium alloy comprising greater than about 92% nickel and at least 0.1% chromium, by weight, and second layers of a second nickel-chromium alloy comprising at least 0.1% nickel and about 14% to about 40% chromium, by weight.

2. The object of claim 1, wherein the nanolaminate coating comprises at least 100 layers.

3. The object of claim 1, wherein the first layers have a thickness ranging from about 25 nanometers to about 75 nanometers, and the second layers have a thickness ranging from about 125 nanometers to about 175 nanometers.

4. The object of claim 1, wherein the first layers comprise greater than about 92% nickel, by weight, and the balance of the first layers is chromium.

5. The object of claim 1, wherein the second layers comprise about 14% to about 21% chromium, by weight, and the balance of the second layers is nickel.

6. The object of claim 1, wherein the first layers, the second layers, or both comprise at least one element selected independently from the group consisting of carbon, cobalt, copper, iron, indium, manganese, niobium, tungsten, molybdenum, and phosphorus.

7. The object of claim 1, wherein the nanolaminate coating has a Vickers microhardness as measured by ASTM E384-1 1 el of 550-750 without heat treatment.

8. The object of claim 1, wherein the substrate comprises one or more metals or other elements selected from the group consisting of C, Co, Cu, Fe, In, Mn, Nb, W, Mo, and P.

9. The object of claim 1, further comprising a nickel strike layer between the surface of the substrate and the nanolaminate coating.

10. The object of claim 1, wherein the nanolaminate coating comprises at least twenty layers.

11. The object of claim 1, wherein the first layers comprise greater than about 94% nickel, by weight and the balance of the first layers is chromium.

12. The object of claim 1, wherein the second layers comprise about 14% to about 41% chromium, by weight and the balance of the second layers is nickel.

13. An object comprising:
a plurality of alternating layers comprising first layers of a first nickel-chromium alloy comprising greater than about 92% nickel and at least 0.1% chromium, by weight, and second layers of a second nickel-chromium alloy comprising at least 0.1% nickel and about 14% to about 40% chromium, by weight, each layer of the plurality of alternating layers having a thickness of less than one micrometer.

14. The object of claim 13, wherein the first layers comprise greater than about 92% nickel, by weight, and the balance of the first layers is chromium; and
wherein the second layers comprise about 14% to about 40% chromium, by weight, and the balance of the second layers is nickel.

15. The object of claim 13, wherein the second layers comprise about 14% to about 21% chromium, by weight, and the balance of the second layers is nickel.

16. The object of claim 13, wherein the first layers comprise greater than about 95% nickel, by weight, and the balance of the first layers is chromium.

17. The object of claim 13, wherein the plurality of alternating layers comprises at least 20 layers.

18. The object of claim 13, wherein the plurality of alternating layers comprises at least 100 layers.

19. The object of claim 13, wherein the first layers have a thickness ranging from about 25 nanometers to about 75 nanometers, and the second layers have a thickness ranging from about 125 nanometers to about 175 nanometers.

* * * * *